(12) United States Patent
Kawasumi et al.

(10) Patent No.: US 10,663,058 B2
(45) Date of Patent: May 26, 2020

(54) VEHICLE SAILING STOP CONTROL METHOD AND CONTROL DEVICE

(71) Applicant: JATCO LTD, Fuji-shi, Shizuoka (JP)

(72) Inventors: Takuro Kawasumi, Fuji (JP); Masayoshi Nakasaki, Fuji (JP); Yoshimasa Nishihiro, Fuji (JP); Yukifumi Ootsuka, Fuji (JP); Yusuke Ota, Fuji (JP); Yusuke Nakano, Fuji (JP)

(73) Assignee: Jatco Ltd., Fuji-shi (JP)

( * ) Notice: Subject to any disclaimer, the term of this patent is extended or adjusted under 35 U.S.C. 154(b) by 46 days.

(21) Appl. No.: 15/756,327

(22) PCT Filed: Sep. 1, 2016

(86) PCT No.: PCT/JP2016/075591
§ 371 (c)(1),
(2) Date: Feb. 28, 2018

(87) PCT Pub. No.: WO2017/051678
PCT Pub. Date: Mar. 30, 2017

(65) Prior Publication Data
US 2018/0245685 A1    Aug. 30, 2018

(30) Foreign Application Priority Data

Sep. 24, 2015   (JP) ................................ 2015-186459

(51) Int. Cl.
*F16H 59/38*    (2006.01)
*F16H 61/14*    (2006.01)
(Continued)

(52) U.S. Cl.
CPC ............. *F16H 59/38* (2013.01); *F16H 61/14* (2013.01); *F16H 61/148* (2013.01);
(Continued)

(58) Field of Classification Search
None
See application file for complete search history.

(56) References Cited

U.S. PATENT DOCUMENTS

| 5,616,100 A | 4/1997 | Sakai et al. |
| 2004/0018913 A1* | 1/2004 | Okamoto ............. F16H 61/143 |
| | | 477/62 |

(Continued)

FOREIGN PATENT DOCUMENTS

| JP | 08-178056 A | 7/1996 |
| JP | 2009-019653 A | 1/2009 |

(Continued)

*Primary Examiner* — Timothy Hannon
(74) *Attorney, Agent, or Firm* — Global IP Counselors, LLP (57) ABSTRACT

A vehicle sailing stop control method is provided for a vehicle including a friction engagement element disposed between a traveling drive source and drive wheels, a torque converter disposed between the friction engagement element and the traveling drive source, and including a lock-up clutch for which a power transmission amount is controlled based on hydraulic pressure, and a hydraulic pressure source that can supply the hydraulic pressure while the traveling drive source is stopped. The vehicle sailing stop control method includes: performing sailing stop control so that coasting is performed by cutting off power transmission of the friction engagement element and stopping the traveling drive source upon a sailing stop travel condition being established; and, during coasting by the sailing stop control, placing the lock-up clutch in a power transmission state in which the hydraulic pressure is applied to the lock-up clutch.

6 Claims, 7 Drawing Sheets

(51) Int. Cl.
*F16H 61/00* (2006.01)
*F16H 59/18* (2006.01)

(52) U.S. Cl.
CPC ...... *F16H 61/0028* (2013.01); *F16H 61/0031* (2013.01); *F16H 2059/186* (2013.01); *Y02T 10/76* (2013.01)

(56) References Cited

U.S. PATENT DOCUMENTS

| | | | |
|---|---|---|---|
| 2004/0144608 A1* | 7/2004 | Kobayashi | F16H 57/04 192/3.3 |
| 2009/0098978 A1* | 4/2009 | Lee | F16H 61/143 477/62 |
| 2011/0172056 A1* | 7/2011 | Ries | F16H 61/143 477/168 |
| 2011/0219903 A1 | 9/2011 | Matsunaga et al. | |
| 2014/0277976 A1* | 9/2014 | Mitsuyasu | F16H 63/46 701/67 |
| 2016/0230821 A1* | 8/2016 | Morino | F16D 48/02 |
| 2016/0368499 A1* | 12/2016 | Kimura | B60K 6/543 |

FOREIGN PATENT DOCUMENTS

| | | |
|---|---|---|
| JP | 2012-101636 A | 5/2012 |
| JP | 2013-117274 A | 6/2013 |
| WO | 2011/111169 A1 | 9/2011 |

\* cited by examiner

VEHICLE SAILING STOP CONTROL METHOD AND CONTROL DEVICE

CROSS-REFERENCE TO RELATED APPLICATIONS

This is a U.S. national phase application of PCT/JP2016/075591, filed on Sep. 1, 2016, which claims priority to Japanese Patent Application No. 2015-186459, filed on Sep. 24, 2015. The entire disclosure of Japanese Patent Application No. 2015-186459 is hereby incorporated herein by reference.

TECHNICAL FIELD

The present invention relates to a vehicle sailing stop control method and control device for which power transmission from a traveling drive source to drive wheels is cut off, the traveling drive source stops, and coasting is performed.

BACKGROUND ART

Conventionally, a vehicle sailing stop control device is known with which, when performing sailing stop control that cuts off power transmission from the traveling drive source to the drive wheels and also stops the traveling drive source, both a forward clutch and a lock-up clutch in a power transmission path are in a released state (see Patent Document 1, for example).

However, in the conventional device, during coasting using sailing stop control, a clutch released state is maintained for which the required flow rate is greater than when maintaining the lock-up clutch in a clutch engaged state. Therefore, when returning to normal traveling from coasting by leaving sailing stop control, the flow rate that can be ensured for engaging the forward clutch is reduced, and there is the problem that a time lag occurs until the forward clutch reaches a power transmission state.

PRIOR ART DOCUMENTS

Patent Documents

Patent Document 1: Japanese Unexamined Patent Publication No. 2013-117274

SUMMARY OF THE INVENTION

Focusing on the abovementioned problem, the purpose of the present invention is to provide a vehicle sailing stop control method and control device for which, when leaving sailing stop control, the time lag until a friction engagement element reaches a power transmission state is shortened.

To achieve the abovementioned purpose, the present invention is a vehicle provided with: a friction engagement element disposed between a traveling drive source and drive wheels; a torque converter disposed between the friction engagement element and the traveling drive source, and provided with a lock-up clutch for which the power transmission amount is controlled based on hydraulic pressure; and a hydraulic pressure source that can supply hydraulic pressure while the traveling drive source is stopped.

The vehicle coasts by using sailing stop control with which, based on establishment of sailing stop travel conditions, power transmission of the friction engagement element is cut off, and the traveling drive source is stopped.

Then, while coasting with the sailing stop control, there is a state for which hydraulic pressure is applied to the lock-up clutch so that the lock-up clutch is in a power transmission state.

Thus, while coasting with sailing stop control for which power transmission of the friction engagement element is cut off and the traveling drive source is stopped, the lock-up clutch is in a state for which hydraulic pressure is applied so as to be in a power transmission state.

Specifically, in regards to the lock-up clutch, the clutch power transmission state is maintained which has a lower required flow rate than when the clutch released state is maintained. Therefore, when leaving sailing stop control and returning from coasting to normal traveling, the flow rate for engaging the friction engagement element increases, and the time required until the friction engagement element is in a power transmission state is shortened.

As a result, when leaving sailing stop control, it is possible to shorten the time lag for the friction engagement element to reach a power transmission state.

MODES FOR CARRYING OUT THE INVENTION

Following, the best mode for carrying out the vehicle sailing stop control method and the control device of the present invention is explained based on Embodiment 1 shown in the drawings.

Embodiment 1

First, the configuration is explained.

The sailing stop control method and control device of Embodiment 1 is applied to an engine vehicle in which is mounted a continuously variable transmission with an auxiliary transmission. Hereafter, the configuration of the sailing stop control device of the engine vehicle of Embodiment 1 is explained divided into the "Overall System Configuration," "Transmission Control Configuration Using the Shift Map," "Circuit Configuration of the Hydraulic Pressure Control System," and "Sailing Stop Control Processing Configuration."

Overall System Configuration

Figure 1:
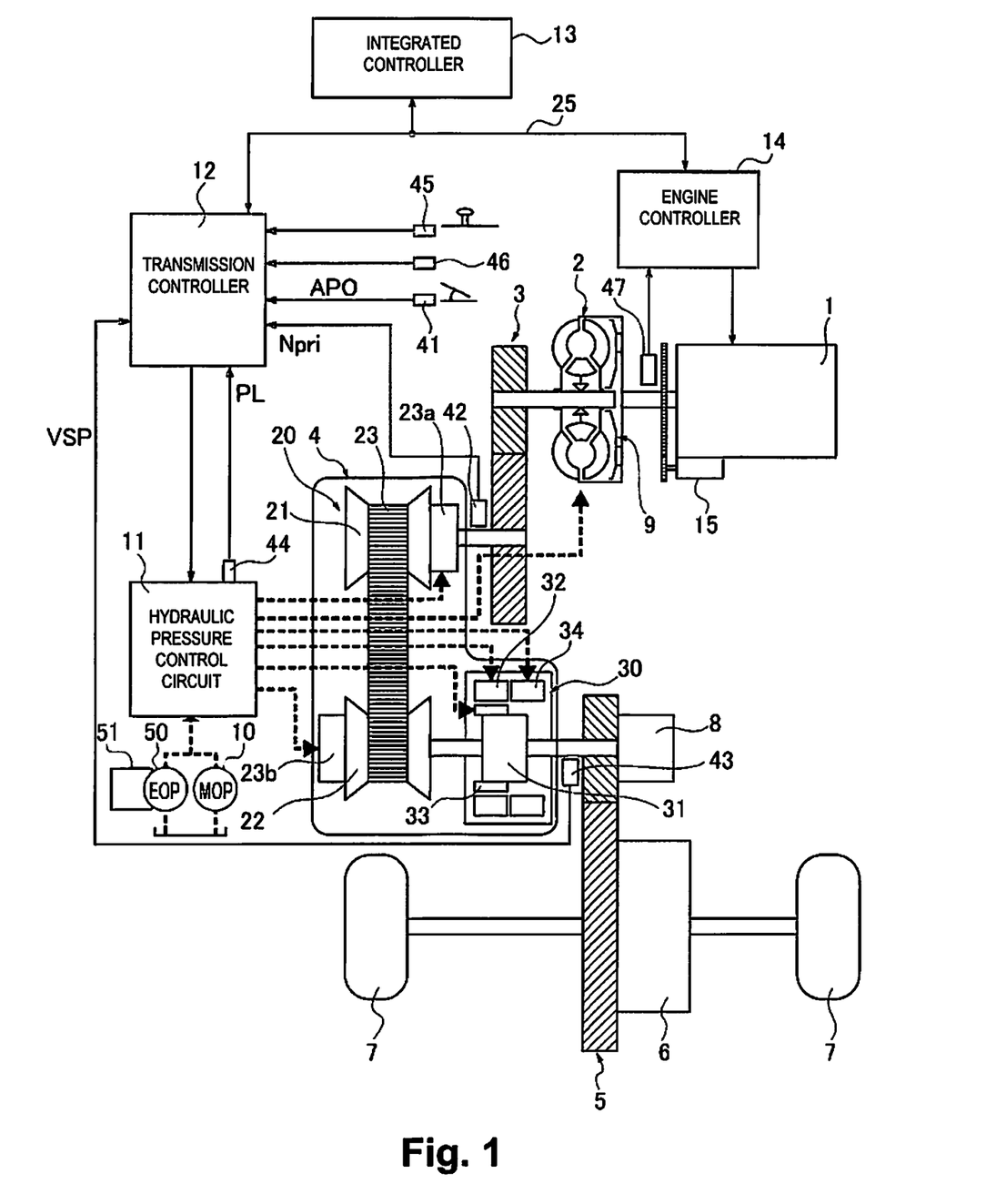
FIG. 1 is an overall configuration diagram showing an engine vehicle in which is mounted a continuously variable transmission with an auxiliary transmission to which the sailing stop control method and control device of Embodiment 1 is applied.
Figure 2:
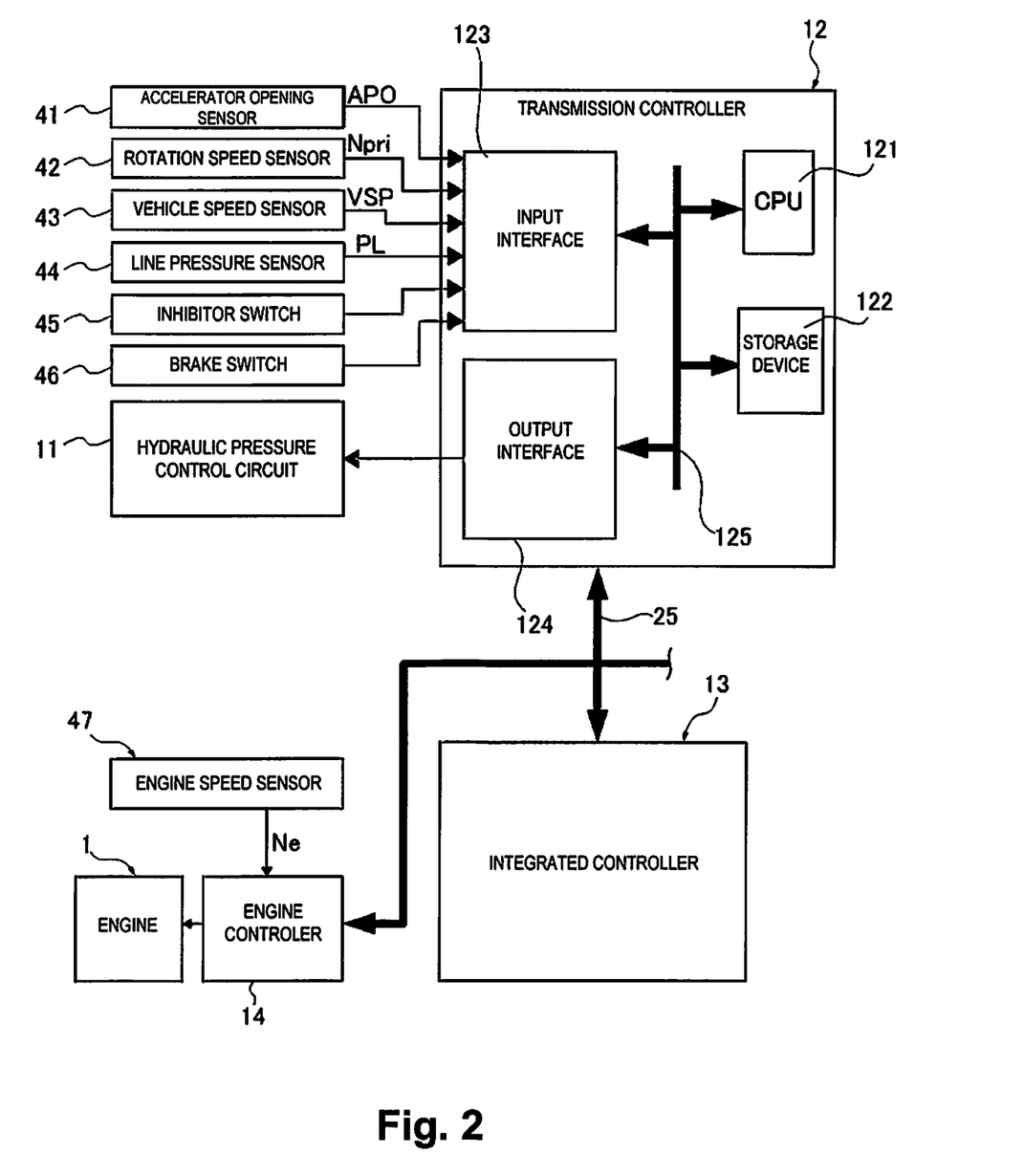
FIG. 2 is a block diagram showing the internal configuration of a transmission controller of Embodiment 1.

FIG. 1 shows the overall configuration of an engine vehicle in which is mounted a continuously variable transmission with auxiliary transmission to which the sailing stop control device of Embodiment 1 is applied, and FIG. 2 shows the internal configuration of a transmission controller. Hereafter, the overall system configuration is explained based on FIG. 1 and FIG. 2.

In the explanation hereafter, the "shift ratio" of a certain transmission mechanism is a value obtained by dividing the input rotation speed of that transmission mechanism by the output rotation speed of that transmission mechanism. Also, the "lowest shift ratio" means the maximum shift ratio of that transmission mechanism, and the "highest shift ratio" means the minimum shift ratio of that transmission mechanism.

The engine vehicle shown in FIG. 1 is provided with an engine 1 having as a traveling drive source a starter motor 15 for starting the engine. The output rotation of the engine 1 is transmitted to the drive wheels 7 via a torque converter 2 having a lock-up clutch 9, a reduction gear pair 3, a continuously variable transmission having an auxiliary transmission 4 (hereafter called "automatic transmission 4"), a final gear pair 5, and a final reduction gear 6. Provided on the final gear pair 5 is a parking mechanism 8 that mechanically locks the output shaft of the automatic transmission 4 to not be able to rotate when parked. As hydraulic pressure sources, provided are a mechanical oil pump 10 driven by the power of the engine 1, and an electric oil pump 50 driven by the power of a motor 51. Also, provided are: a hydraulic pressure control circuit 11 that does pressure regulation of the discharge pressure from the mechanical oil pump 10 and the electric oil pump 50, and supplies that to each part of the automatic transmission 4; a transmission controller 12 that controls the hydraulic pressure control circuit 11; an integrated controller 13; and an engine controller 14. Each configuration is explained hereafter.

The automatic transmission 4 is provided with a belt type continuously variable transmission mechanism (hereafter referred to as "variator 20"), and an auxiliary transmission mechanism 30 provided in series with the variator 20. Here "provided in series" means that the variator 20 and the auxiliary transmission mechanism 30 are provided in series in the power transmission path. The auxiliary transmission mechanism 30 can be connected directly to the output shaft of the variator 20 as shown in this example, or can also be connected via another transmission or power transmission mechanism (e.g. a gear train).

The variator 20 is a belt type continuously variable transmission mechanism that is provided with a primary pulley 21, a secondary pulley 22, and a V belt 23 that is wound around between the pulleys 21, 22. The pulleys 21, 22 are respectively provided with: a fixed conical plate; a movable conical plate placed in a state opposing the sheave surface with respect to this fixed conical plate, forming a V groove with the fixed conical plate; and a primary hydraulic pressure cylinder 23a and secondary hydraulic pressure cylinder 23b provided on the back surface of this movable conical plate, displacing the movable conical plate in the axial direction. When the hydraulic pressure supplied to the primary hydraulic pressure cylinder 23a and the secondary hydraulic pressure cylinder 23b is adjusted, the width of the V groove changes, the contact radius between the V belt 23 and each pulley 21, 22 changes, and the shift ratio of the variator 20 changes steplessly.

The auxiliary transmission mechanism 30 is a transmission mechanism with two forward gears and one reverse gear. The auxiliary transmission mechanism 30 is provided with a Ravigneaux planetary gear mechanism 31 for which two planetary gear carriers are connected, and a plurality of friction engagement elements (low brake 32, high clutch 33, reverse brake 34) connected to a plurality of rotation elements configuring the Ravigneaux planetary gear mechanism 31, for changing the linking state thereof.

The transmission level of the auxiliary transmission mechanism 30 changes when the hydraulic pressure supplied to each friction engagement element 32-34 is adjusted and the engagement and release state of the friction engagement elements 32-34 is changed. For example, if the low brake 32 is engaged, and the high clutch 33 and the reverse brake 34 are released, the transmission level of the auxiliary transmission mechanism 30 goes to forward $1^{st}$ gear (hereafter called "low speed mode"). If the high clutch 33 is engaged, and the low brake 32 and the reverse brake 34 are released, the transmission level of the auxiliary transmission mechanism 30 goes to a shift ratio lower than $1^{st}$ gear to be forward $2^{nd}$ gear (hereafter called "high speed mode"). Also, if the reverse brake 34 is engaged, and the low brake 32 and the high clutch 33 are released, the transmission level of the auxiliary transmission mechanism 30 goes to reverse gear. If the low brake 32, the high clutch 33, and the reverse brake 34 of the auxiliary transmission mechanism 30 are all released, the driving force transmission path to the drive wheels 7 is cut off. The low brake 32 and the high clutch 33 are called "forward clutch Fwd/C" hereafter.

As shown in FIG. 2, the transmission controller 12 is configured from a CPU 121, a storage device 122 comprising RAM and ROM, an input interface 123, an output interface 124, and a bus 125 that mutually connects these. This transmission controller 12 reaches a prescribed transmission level by controlling the shift ratio of the variator 20, and changing the application of the plurality of friction engagement elements of the auxiliary transmission mechanism 30 (low brake 32, high clutch 33, reverse brake 34).

Input to the input interface 123 are, for example, output signals of an accelerator opening sensor 41 that detects the pressing opening of the accelerator pedal (hereafter referred to as "accelerator opening APO"), output signals of a rotation speed sensor 42 that detects input rotation speed of the automatic transmission 4 (=rotation speed of primary pulley 21, hereafter referred to as "primary rotation speed Npri"), output signals of a vehicle speed sensor 43 that detects the vehicle traveling speed (hereafter referred to as "vehicle speed VSP"), output signals of a line pressure sensor 44 that detects the line pressure of the automatic transmission 4 (hereafter referred to as "line pressure PL"), output signals of an inhibitor switch 45 that detects the position of a selection lever, and output signals of a brake switch 46 that detects the braking state.

Stored in the storage device 122 are a transmission control program of the automatic transmission 4, and a shift map (FIG. 4) used with this transmission control program. The CPU 121 reads and executes the transmission control program stored in the storage device 122, implements various types of computation processing on the various signals input via the input interface 123 and generates a transmission control signal, and outputs the generated transmission control signal to the hydraulic pressure control circuit 11 via the output interface 124. The various values used with the computational processing by the CPU 121 and the computation results are stored as appropriate in the storage device 122.

The hydraulic pressure control circuit 11 is configured by a plurality of flow paths, and a plurality of hydraulic pressure control valves. The hydraulic pressure control circuit 11 controls the plurality of hydraulic pressure control valves based on the transmission control signal from the transmission controller 12, and switches the supply path of the hydraulic pressure. This is described in detail later.

The integrated controller 13 performs integrated management of the plurality of onboard controllers so as to have transmission control by the transmission controller 12, engine control by the engine controller 14, etc., be suitably secured. This integrated controller 13 can be connected so that information exchange with an onboard controller such as the transmission controller 12, the engine controller 14, etc., is possible via a CAN communication line 25. It also performs sailing stop control to stop the engine 1 during coasting, etc.

The engine controller 14 performs engine stop control by cutting fuel to the engine 1, and engine start control that starts the engine 1 using the starter motor 15, etc. Input to this engine controller 14 are output signals of the engine speed sensor 47 that detects the rotation speed of the engine 1 (hereafter referred to as "engine speed Ne"), etc.

Transmission Control Configuration Using the Shift Map

Figure 3:
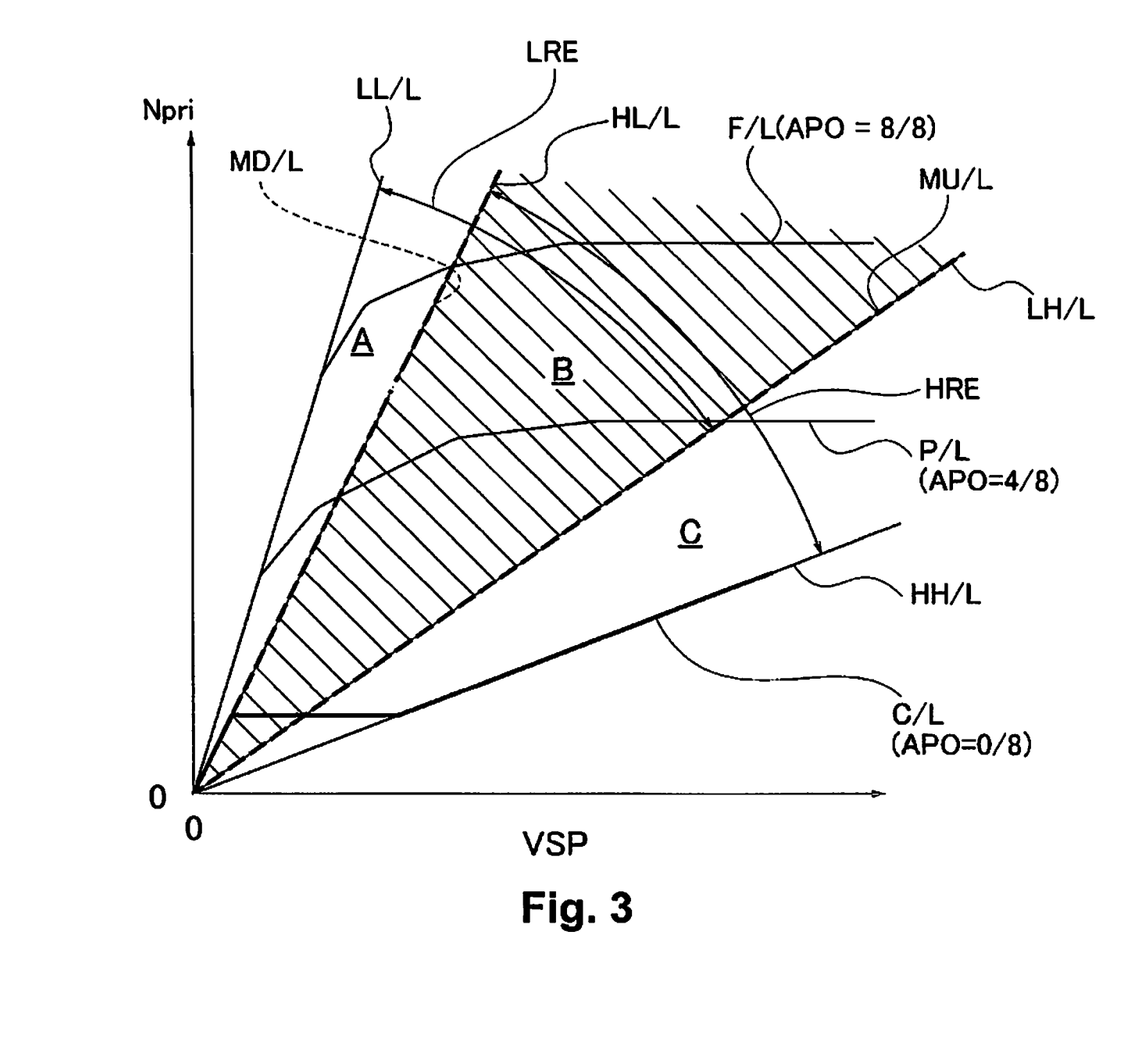
FIG. 3 is a shift map diagram showing an example of a shift map stored in a storage device of the transmission controller of Embodiment 1.

FIG. 3 shows an example of a shift map stored in the storage device of the transmission controller. Hereafter, the transmission control configuration using the shift map is explained based on FIG. 3.

The operating point of the automatic transmission 4 is determined based on the vehicle speed VSP and the primary rotation speed Npri on the shift map shown in FIG. 3. The slope of the connecting line between the operating point of the automatic transmission 4 and the zero point of the lower left corner of the shift map expresses the shift ratio of the automatic transmission 4 (the overall shift ratio obtained by multiplying the shift ratio of the auxiliary transmission mechanism 30 subRatio on the shift ratio of the variator 20 vRatio, hereafter referred to as "through shift ratio Ratio").

On this shift map, the same as with the shift map of the conventional belt type continuously variable transmission, the shift line is set for each accelerator opening APO, and shifting of the automatic transmission 4 is performed according to the shift line selected according to the accelerator opening APO. For simplicity in FIG. 3, only a full load line F/L (shift line when accelerator opening APO=8/8), partial line P/L (shift line when accelerator opening APO=4/8), and coasting line C/L (shift line when accelerator opening APO=0) are shown.

When the automatic transmission 4 is in low speed mode, the automatic transmission 4 is able to shift between the low speed mode lowest line LL/L obtained by maximizing the shift ratio vRatio of the variator 20, and the low speed mode highest line LH/L obtained by minimizing the shift ratio vRatio of the variator 20. At this time, the operating point of the automatic transmission 4 moves inside an A region and a B region. On the other hand, when the automatic transmission 4 is in high speed mode, it is possible for the automatic transmission 4 to shift between the high speed mode lowest line HL/L obtained by maximizing the shift ratio vRatio of the variator 20, and the high speed mode highest line HH/L obtained by minimizing the shift ratio vRatio of the variator 20. At this time, the operating point of the automatic transmission 4 moves inside the B region and a C region.

The shift ratio of each transmission level of the auxiliary transmission mechanism 30 is set so that the shift ratio corresponding to the low speed mode highest line LH/L (low speed mode highest shift ratio) is smaller than the shift ratio corresponding to the high speed mode lowest line LH/L (high speed mode lowest shift ratio). As a result, there is partial overlap between low speed mode ratio range LRE which is the range of the through shift ratio Ratio of the automatic transmission 4 that can be taken in the low speed mode, and high speed mode ratio range HRE which is the through shift ratio Ratio of the automatic transmission 4 that can be taken in the high speed mode. When the operating point of the automatic transmission 4 is in the B region sandwiched by the high speed mode lowest line HL/L and the low speed mode highest line LH/L (overlapping region), the automatic transmission 4 can select either mode of the low speed mode or the high speed mode.

The transmission controller 12 references this shift map and sets the through shift ratio Ratio corresponding to the vehicle speed VSP and the accelerator opening APO (vehicle driving state) as the destination through shift ratio DRatio. This destination through shift ratio DRatio is the target value for the through shift ratio Ratio to finally reach in that driving state. Also, the transmission controller 12 sets a target through shift ratio tRatio which is the transient target value to have the through shift ratio Ratio follow the destination through shift ratio DRatio with desired response characteristics, and controls the variator 20 and the auxiliary transmission mechanism 30 so that the through shift ratio Ratio matches the target through shift ratio tRatio.

On the shift map, a mode switching upshift line MU/L that performs upshifting of the auxiliary transmission mechanism 30 (1→2 upshift line of the auxiliary transmission mechanism 30) is set so as to approximately overlap on the low speed mode highest line LH/L. The through shift ratio Ratio that corresponds to the mode switching upshift line MU/L is approximately equal to the low speed mode highest line LH/L (low speed mode highest shift ratio). Also, on the shift map, the mode switching downshift line MD/L that performs downshifting of the auxiliary transmission mechanism 30 (2→1 downshift line of the auxiliary transmission mechanism 30) is set so as to approximately overlap on the high speed mode lowest line HL/L. The through shift ratio Ratio that corresponds to the mode switching downshift line MD/L is approximately equal to the high speed mode lowest shift ratio (high speed mode lowest line HL/L).

Also, when the operating point of the automatic transmission 4 crosses the mode switching upshift line MU/L or the mode switching downshift line MD/L, specifically, when the target through shift ratio tRatio of the automatic transmission 4 straddles the mode switching shift ratio mRatio and changes, or when it matches the mode switching shift ratio mRatio, the transmission controller 12 performs mode switching shift control. With this mode switching shift control, the transmission controller 12 performs shifting of the auxiliary transmission mechanism 30, and performs "cooperative control" which has cooperation of two shifts so as to have the shift ratio vRatio of the variator 20 change in the reverse direction to the direction in which the shift ratio subRatio of the auxiliary transmission mechanism 30 changes.

With the "cooperative control," when the target through shift ratio tRatio of the automatic transmission 4 crosses the mode switching upshift line MU/L facing from the B region side to the C region side, or matches the mode switching upshift line MU/L from the B region side, the transmission controller 12 outputs a 1→2 upshift determination, and changes the transmission level of the auxiliary transmission mechanism 30 from $1^{st}$ gear to $2^{nd}$ gear, and changes the shift ratio vRatio of the variator 20 from the highest shift ratio to the low shift ratio. Conversely, when the target through shift ratio tRatio of the automatic transmission 4 crosses the mode switching downshift line MD/L facing from the B region side to the A region side, or when it matches the mode switching downshift line MD/L from the B region side, the transmission controller 12 outputs a 2→1 downshift determination, and changes the transmission level of the auxiliary transmission mechanism 30 from $2^{nd}$ gear to $1^{st}$ gear, and changes the shift ratio vRatio of the variator 20 from the lowest shift ratio to the high shift ratio side.

During the mode switching upshift or during the mode switching downshift, the reason for performing the "cooperative control" that changes the shift ratio vRatio of the variator 20 is to be able to suppress the uncomfortable sense for the driver that comes with changes in input rotation speed that occurs due to steps of the through shift ratio Ratio of the automatic transmission 4, and to be able to ease the shift shock of the auxiliary transmission mechanism 30.

Circuit Configuration of the Hydraulic Pressure Control System

Figure 4:
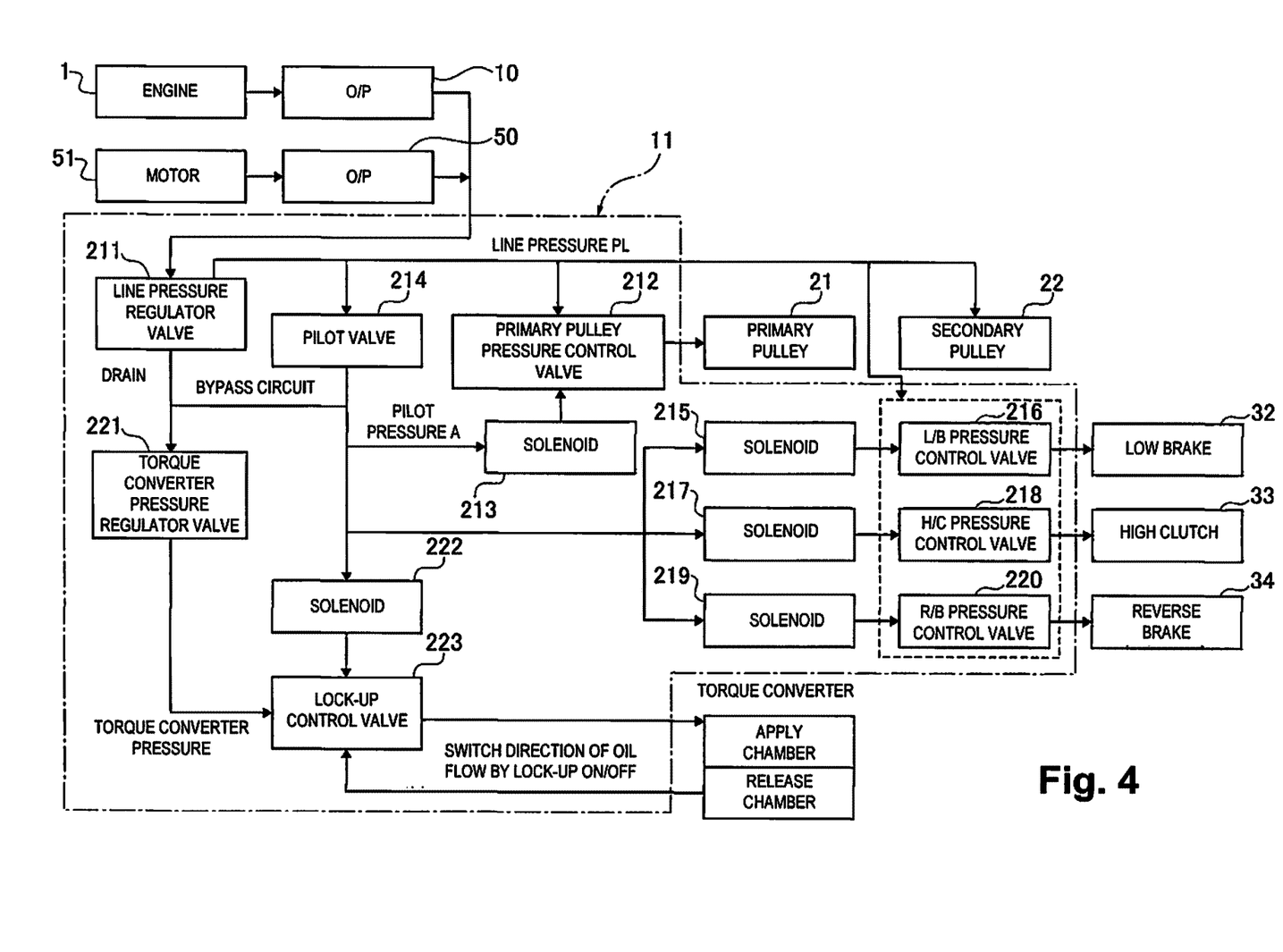
FIG. 4 is a block circuit diagram showing the circuit configuration of a hydraulic pressure control system in the continuously variable transmission with an auxiliary transmission of Embodiment 1.

FIG. 4 shows the circuit configuration of the hydraulic pressure control system in the automatic transmission 4 of Embodiment 1. Following, the hydraulic pressure control system configuration centered on the hydraulic pressure control circuit 11 is explained based on FIG. 4.

As shown in FIG. 4, as the control circuit for hydraulic pressure to the primary pulley 21 and the secondary pulley 22, provided are a line pressure regulator valve 211, a primary pulley pressure control valve 212, a solenoid 213, and a pilot valve 214.

Specifically, with the hydraulic oil discharged from the mechanical oil pump 10 or the electric oil pump 50 as the hydraulic pressure source, the line pressure PL is pressure regulated by the line pressure regulator valve 211. With the line pressure PL as the source pressure to the primary hydraulic pressure cylinder 23a of the primary pulley 21, hydraulic pressure that is pressure regulated by the primary pulley pressure control valve 212 based on the operating signal pressure from the solenoid 213 is supplied. The line pressure PL is supplied to the secondary hydraulic pressure cylinder 23b of the secondary pulley 22. The operating signal pressure from the solenoid 213 is based on pilot A pressure, and is the same as the operating signal pressure from the solenoid described hereafter.

As shown in FIG. 4, as the hydraulic pressure circuit to the auxiliary transmission mechanism 30, provided are a solenoid 215, a low brake pressure control valve 216, a solenoid 217, a high clutch pressure control valve 218, a solenoid 219, and a reverse brake pressure control valve 220.

Specifically, with the line pressure PL as the source pressure, hydraulic pressure that is pressure regulated by the low brake pressure control valve 216 based on the operating signal pressure from the solenoid 215 is supplied to the low brake 32. With line pressure PL as the source pressure, hydraulic pressure that is pressure regulated by the high clutch pressure control valve 218 based on the operating signal pressure from the solenoid 217 is supplied to the high clutch 33. With line pressure PL as the source pressure, hydraulic pressure that is pressure regulated by the reverse brake pressure control valve 220 based on the operating signal pressure from the solenoid 219 is supplied to the reverse brake 34.

As shown in FIG. 4, as the hydraulic pressure circuit to the torque converter 2, provided are a torque converter pressure regulator valve 221, a solenoid 222, and a lock-up control valve 223.

Specifically, with the torque converter pressure regulator valve 221, the torque converter pressure is pressure regulated with the drain hydraulic oil led via the bypass circuit from the line pressure regulator valve 211 and the pilot valve 214 as the source pressure. With the lock-up control valve 223, with the torque converter pressure from the torque converter pressure regulator valve 221 as the source pressure, the hydraulic pressure of the apply chamber and the release chamber of the torque converter 2 is controlled based on the operating signal pressure from the solenoid 222. Here, the apply chamber and the release chamber are the internal chambers of the torque converter 2 defined via the lock-up clutch 9. Also, when engaging the lock-up clutch 9, hydraulic pressure is supplied to the apply chamber, and differential pressure engagement is established with the flow that drains the hydraulic oil of the release chamber. When releasing the lock-up clutch 9 in an engaged state, the direction of the oil flow is switched, hydraulic pressure is supplied to the release chamber, and the lock-up clutch 9 is released by the flow of hydraulic oil returning via the apply chamber. The lock-up pressure (L/U pressure) of the lock-up clutch 9 is expressed by the formula L/U pressure =(apply pressure−release pressure).

Sailing Stop Control Processing Configuration

Figure 5:
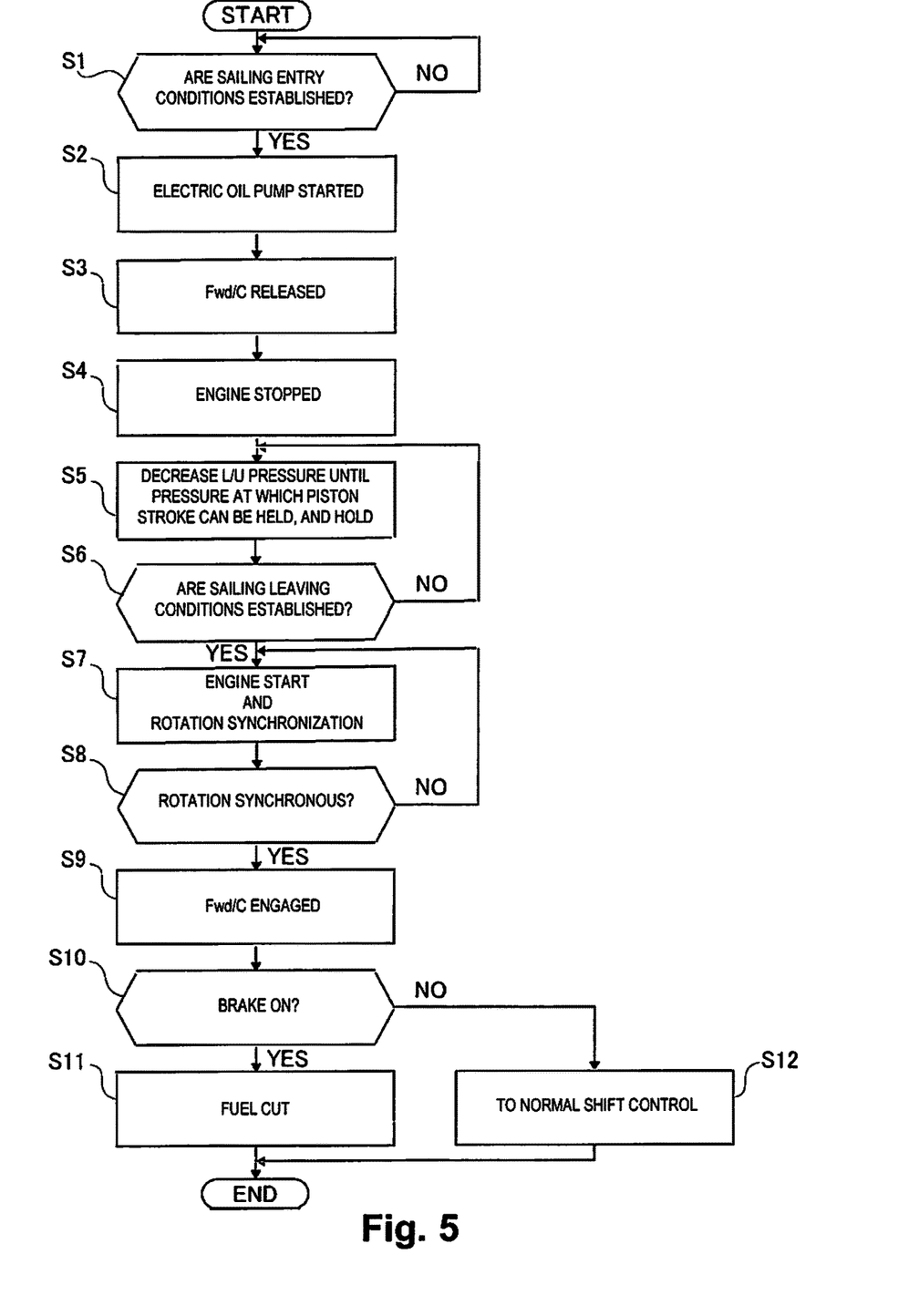
FIG. 5 is a flow chart showing the flow of the sailing stop control process executed by an integrated controller of Embodiment 1.

FIG. 5 shows the flow of the sailing stop control processing configuration executed by the integrated controller 13 of Embodiment 1 (sailing stop control unit). Hereafter, each step of FIG. 5 that represents the sailing stop control processing configuration is explained. The brake pedal is assumed to be in a pedal foot released state.

At step S1, with the engine 1 as the traveling drive source, while traveling with the forward clutch Fwd/C (low brake 32 or high clutch 33) engaged, a judgment is made of whether the sailing entry conditions are established. When YES (sailing entry conditions are established), the process advances to step S2, and when NO (sailing entry conditions are not established), the process repeats the judgment of step S1.

Here, "sailing entry conditions" means:

(a) when traveling forward using the engine drive (determined using range position signal or vehicle speed signal, etc.)

(b) Brake is OFF (determined using the brake switch signal)

(c) Accelerator is OFF (determined by accelerator opening signal of opening=0), and when a prescribed time in a state with all the abovementioned conditions (a) to (c) established (delay time: for example 1 second to 2 seconds) has elapsed, the sailing entry conditions are deemed to be established. Specifically, this is set to the condition of detecting that coasting is performed, with the driver not intending to accelerate or stop.

At step S2, following the judgment that the sailing entry conditions are established in step S1, the motor 51 of the electric oil pump 50 is started, and the process advances to step S3.

By this starting of the motor of the electric oil pump 50, during sailing stop control, the hydraulic pressure source is secured that has a state of hydraulic pressure being applied for the lock-up clutch 9 to be in a power transmission state.

At step S3, following the start of the motor of the electric oil pump 50 at step S2, the forward clutch Fwd/C which is in an engaged state is released, and the process advances to step S4.

Here, during forward traveling with the low speed mode selected, the low brake 32 is released, and during forward traveling with the high speed mode selected, the high clutch 33 is released.

At step S4, following release of the forward clutch Fwd/C at step S3, a command is output to stop the engine 1 by cutting fuel (fuel cut) or stopping the ignition, and the process advances to step S5.

By this stopping of the engine 1, based on the sailing entry conditions being established (=the sailing stop travel conditions have been established), a coasting stance is given by sailing stop control of cutting off the power transmission of the forward clutch Fwd/C, and stopping the engine 1.

At step S5, following stopping of the engine 1 at step S4, or the judgment that the sailing leaving conditions are not established at step S6, when the lock-up clutch 9 is in an engaged state, the L/U pressure decreases until the pressure at which a piston stroke can be held, the decreased L/U pressure is held, and the process advances to step S6.

Here, when the lock-up clutch 9 is in an engaged state, when the L/U pressure is decreased until the pressure at which a piston stroke can be held, this means making "a state for which hydraulic pressure is applied to put the lock-up clutch 9 in a power transmission state."

Also, the lock-up clutch 9 before coasting start by the sailing stop control can be any of the released state, a slipped state, or engaged state, and is acceptable provided that during coasting, there is a state for which hydraulic pressure is applied to the lock-up clutch 9 to put it in a power transmission state.

Furthermore, "a state for which hydraulic pressure is applied to put it in a power transmission state" is acceptable whether the lock-up clutch 9 is actually transmitting power or not. Specifically, this includes a state for which though hydraulic pressure is applied to the lock-up clutch 9, power is not transmitted, and a state for which hydraulic pressure is applied to the lock-up clutch 9 that is transmitting power.

With engagement/release control of a normally set lock-up clutch 9, the lock-up clutch 9 is released in a low vehicle speed region of a set vehicle speed or less with vehicle speed VSP set so as to prevent engine stall, and the lock-up clutch 9 is engaged in all vehicle speed regions for which the vehicle speed VSP exceeds the set vehicle speed.

At step S6, following the L/U pressure decrease and holding until the pressure at which the piston stroke can be held at step S5, during coasting by sailing control, a judgment is made of whether sailing leaving conditions are established. When YES (sailing leaving conditions established), the process advances to step S7, and when NO (sailing leaving conditions not established), the process returns to step S5.

Here, the "sailing leaving conditions" mean that the accelerator is ON (determined by the accelerator opening signal of opening degree >0), or that the brake is ON (determined by the brake switch signal). In other words, after releasing the foot from the accelerator, when moving to press the accelerator, the sailing leaving conditions are established. Also, after releasing the foot from the brake, when moving to press the brake, the sailing leaving conditions are established.

At step S7, following a judgment that the sailing leaving conditions are established at step S6, or a judgment that the rotation is asynchronous in step S8, engine start control and rotation synchronization control by the starter motor 15 are performed, and the process advances to step S8.

Here, rotation synchronization control means control for synchronizing the input rotation speed (dependent on engine speed) and the output rotation speed (dependent on the rotation speed of the drive wheels 7) of the forward clutch Fwd/C released at step S3.

At step S8, following the engine start control and rotation synchronization control at step S7, a judgment is made of whether or not the input rotation speed and output rotation speed of the forward clutch Fwd/C are synchronized. When YES (rotation is synchronized), the process advances to step S9, and when NO (rotation is asynchronous), the process returns to step S7.

Here, for rotation synchronization, when the difference between the forward clutch Fwd/C input rotation speed and output rotation speed is a synchronization permitted threshold or less, this is determined to be rotation synchronization.

At step S9, following the judgment that rotation is synchronous at step S8, the forward clutch Fwd/C that was released at step S3 is engaged, and the process advances to step S10.

At step S10, following the engagement of the forward clutch Fwd/C at step S9, a judgment is made of whether there is a brake operation. When YES (there is a brake operation), the process advances to step S11, and when NO (there is no brake operation), the process advances to step S12.

At step S11, following the judgment that there is a brake operation at step S10, fuel cutting is executed to stop fuel injection to the engine 1, and the process advances to the end.

At step S12, following the judgment that there is no brake operation at step S10, there is a move to normal shift control, and the process advances to the end.

Next, the operation is explained.

The operation in the sailing stop control device of the engine vehicle of Embodiment 1 is explained divided into "Sailing Stop Control Operation with a Comparison Example," "Sailing Stop Control Processing Operation," "Sailing Stop Control Operation," "Feature Operation of the Sailing Stop Control Method," and "Other Feature Operations."

Sailing Stop Control Operation with a Comparison Example

During sailing stop control, an item for which both the forward clutch Fwd/C and the lock-up clutch LU/C are in a released state is used as a comparison example.

As with the abovementioned comparison example, the following points are conceivable with the reason that during sailing stop control, both the forward clutch Fwd/C and the lock-up clutch LU/C are in a released state. When doing sailing stop control, when only the lock-up clutch LU/C is released, the torque from the drive wheels enters the engine due to fluid inside the torque converter, this becomes an engine drag load, and the sailing stop traveling distance decreases. In order to prevent this, rather than the lock-up clutch LU/C, the forward clutch Fwd/C is released.

Here, when ending sailing stop control, to have power transmitted from the engine to the drive wheels, it is necessary to engage the forward clutch Fwd/C, and when engaging the forward clutch Fwd/C that is in a differential rotation state, engagement shock occurs. When engaging slowly in order to prevent engagement shock, there is a drive power response lag. In order to ease this engagement shock, during sailing stop control, the lock-up clutch LU/C is in a released state.

From such points, it is conceivable to have the forward clutch Fwd/C and the lock-up clutch LU/C be in a released state during sailing stop control.

However, in the comparison example, when an accelerator pressing operation is performed, and there is a return from sailing stop control, with a rise in pulley pressure or a delay in engagement of the forward clutch Fwd/C, a lag occurs up to forward/reverse G occurrence, so drivability worsens.

The reasons for this are:
During sailing stop control, the engine is completely stopped, so there is no supply of oil from the CVT oil pump (engine drive).
The time from engine start until engagement of the forward clutch Fwd/C is short, so the oil pump supply flow rate is limited.
The electric oil pump is built in, but as the pulley pressure is made to rise, the necessary output to engage the forward clutch Fwd/C is not provided.

Sailing Stop Control Processing Operation

The sailing stop control processing operation of Embodiment 1 is explained based on the flow chart shown in FIG. 5.

First, with the engine 1 as the traveling drive source, while traveling with the forward clutch Fwd/C engaged, when the sailing entry conditions are established, in the flow chart of FIG. 5, the process advances from Step S1→Step S2→Step S3→Step S4→Step S5→Step S6. Then, at step S6, during the judgment that the sailing leaving conditions are not established, the flow advancing from step S5→Step S6 is repeated. At step S2, the motor 51 of the electric oil pump 50 is started. At step S3, the forward clutch Fwd/C in an engaged state is released. At step S4, a command is output to stop the engine 1 by a fuel cut or ignition stop. At step S5, when the lock-up clutch 9 is in an engaged state, the L/U pressure is decreased to the pressure at which the piston stroke can be held, and the decreased L/U pressure is held.

In this way, during coasting using sailing stop control, the state is such that the forward clutch Fwd/C is released, the engine 1 is stopped, and the lock-up clutch LU/C has hydraulic pressure applied to be in a power transmission state.

On the other hand, at step S6, when it is determined that the sailing leaving conditions are established, in the flow chart of FIG. 5, the process advances from step S6 to Step S7→Step S8. Then, while it is determined at step S8 that rotation is asynchronous, the flow of advancing from step S7→step S8 is repeated. At step S7, engine start control and rotation synchronization control is performed by the starter motor 15. After that, the rotation speed of the engine 1 rises, and when it is determined at step S8 that rotation is synchronous, at the next step S9, the forward clutch Fwd/C that was released at step S3 is engaged.

In this way, when leaving from the sailing stop control, the engine 1 is started, and after going through rotation synchronization control, the forward clutch Fwd/C is engaged, and the engine 1 which is the traveling drive source is returned to the normal traveling state.

When leaving from the sailing stop control, at step S10, a judgment is made of whether or not there is a brake operation. When there is a brake operation which indicates that the driver intends to decelerate, the process advances from step S10 to step S11, and fuel cutting is executed to stop fuel injection to the engine 1. On the other hand, when there is no brake operation indicating that the driver intends to accelerate, the process advances from step S10 to step S12, and at step S12, there is a move to normal shift control.

Sailing Stop Control Operation

The aim of sailing stop control is, regardless of the vehicle speed range during traveling, when doing an operation of releasing the foot off the accelerator, to release the forward clutch Fwd/C (power transmission mechanism) that transmits power from the engine 1. As a result, the engine 1 and the drive wheels 7 are disconnected, and by preventing deceleration by engine braking, the idle travel distance when doing the operation of releasing the foot off the accelerator is extended, travel that consumes fuel by driving the engine 1 is reduced, and as a result, fuel efficiency is improved. Furthermore, the engine 1 is stopped, and the fuel for maintaining idling is saved.

Figure 6:
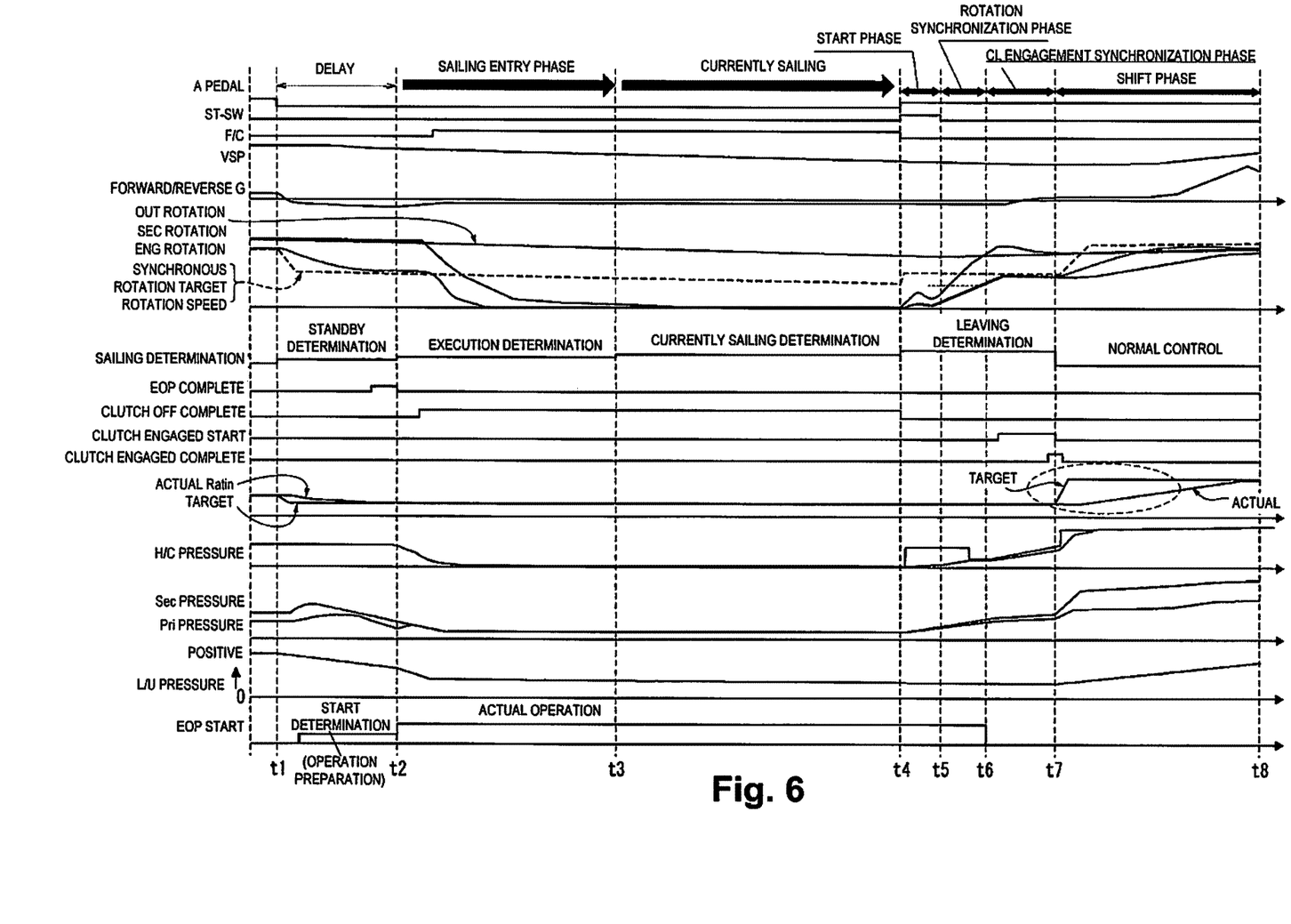
FIG. 6 is a term chart showing the characteristics of, when sailing stop control is executed, the A pedal, ST-SW• F/C• VSP• Forward-reverse G• OUT rotation• SEC rotation• ENG rotation• Rotation synchronization target rotation speed• Sailing determination• EOP completion• Clutch off completion• Clutch engagement start•Clutch engagement complete• Actual ratio• Target ratio• H/C pressure• Sec pressure•Pri pressure• L/U pressure• EOP start.

The sailing stop control operation with Embodiment 1 for realizing the aim of the abovementioned sailing stop control is explained based on the time chart shown in FIG. 6.

In FIG. 6, time t1 is the accelerator Off/brake Off conditions established time, time t2 is the sailing entry conditions established time, time t3 is the currently sailing determination start time, and time t4 is the sailing leaving conditions established time. Time t5 is the start phase end time, time t6 is the rotation synchronization phase end time, time t7 is the CL engagement phase end time, and time t8 is the shift phase end time. Also, t1-t2 is a delay interval, t2-t3 is a sailing entry phase interval, and time t3-t4 is a currently sailing interval. Time t4-t5 is a start phase interval, time t5-t6 is a rotation synchronization phase interval, time t6-t7 is a CL engagement phase interval, and time t7-t8 is a shift phase interval.

When the accelerator Off/brake Off conditions are established at time t1, in the time t1-t2 delay interval, the forward/reverse G moves to decelerating after accelerating, the engine speed starts to decrease, and the target shift ratio decreases. The "sailing determination" in this delay interval is a standby determination, and electric oil pump 50 operation preparation is performed.

When the sailing entry conditions are established at time t2, the actual operation by the electric oil pump 50 is started at time t2, and simultaneous with starting the decrease in the high clutch pressure (H/C pressure) and releasing the high clutch 33, the decrease in lock-up pressure (L/U pressure) is started, and when this decreases to the pressure at which the piston stroke is held, that pressure is held. As is clear from the L/U pressure characteristics from the time t2 of FIG. 6 and thereafter, from time t2 and thereafter, since the L/U pressure (apply pressure–release pressure) is positive, so the lock-up clutch 9 is in a "state with hydraulic pressure applied to be in a power transmission state".

Also, in the sailing entry phase interval of time t2-t3, when release of the high clutch 33 is confirmed, fuel cutting of the engine 1 starts. The "sailing determination" in this sailing entry phase interval of time t2-t3 is an execution determination, and actual operation of the electric oil pump 50 is maintained.

When the currently sailing determination is started at time t3, the engine speed and the secondary pulley rotation speed transition in a stopped state, the high clutch 33 maintains release, and the lock-up pressure (L/U pressure) gradually decreases with a slight gradient due to the leak portion. The "sailing determination" in this currently sailing interval of time t3-t4 is a currently sailing determination, and the actual operation of the electric oil pump 50 is maintained.

When the sailing leaving conditions are established at time t4, starting of the engine 1 by the starter motor 15 is started, and output of an initial pressure command of the high clutch pressure (H/C pressure) is started. With this time t4-t5, the "sailing determination" of the start phase interval is a leaving determination, and the actual operation of the electric oil pump 50 is maintained. In this way, when the sailing leaving conditions are established at time t4, the engagement of the forward clutch Fwd/C has priority over the engagement of the lock-up clutch 9, the initial pressure command of the high clutch pressure (H/C pressure) is output and hydraulic pressure is supplied. The reason for this is that even if the lock-up clutch 9 is in a released state, the torque converter 2 is capable of power transmission using fluid. On the other hand, the forward clutch Fwd/C cannot perform power transmission in a released state. Therefore, the engagement of the forward clutch Fwd/C has priority over the engagement of the lock-up clutch 9.

When the start phase ends at time t5, a rotation synchronization determination is performed by comparing the engine 1 rotation speed rise and the rotation synchronization target rotation speed. The "sailing determination" in this rotation synchronization phase interval of time t5-t6 is a leaving determination, and the actual operation of the electric oil pump 50 is maintained.

When the rotation synchronization phase ends at time t6, the electric oil pump 50 is stopped, the high clutch pressure (H/C pressure) is raised, and engagement control of the high clutch 33 is performed that increases the torque transmission capacity. The "sailing determination" in this CL engagement phase interval of time t6-t7 is a leaving determination, and stopping of the electric oil pump 50 is maintained. Specifically, when the rotation synchronization phase ends, the hydraulic pressure source switches from the electric oil pump 50 to the mechanical oil pump 10.

When the CL engagement phase ends at time t7, the shift phase is entered that controls the actual shift ratio of the variator 20 to match the target shift ratio, and the shift phase ends at time t8. The "sailing determination" of this shift phase interval of time t7-t8 is normal control, the primary pressure and the secondary pressure are raised, and also the lock-up pressure (L/U pressure) is gradually raised. When leaving from the sailing stop control, when there is a problem such as engagement shock of the lock-up clutch 9, etc., the slipped engagement state is passed through and is moved to a completely engaged state.

Feature Operation of the Sailing Stop Control Method

With Embodiment 1, while coasting with sailing stop control that cuts off power transmission of the drive system clutch Fwd/C and also stops the engine 1, the lock-up clutch 9 is in a state with hydraulic pressure applied to put it in a power transmission state.

Therefore, when leaving sailing stop control, the flow rate taken up by the lock-up clutch 9 is reduced, and it is possible to increase the flow rate for engaging the drive system clutch Fwd/C. Because of that, when ending coasting by sailing stop control, it is possible to shorten the time until power is transmitted by the drive system clutch Fwd/C.

Specifically, when engaged, the lock-up clutch 9 supplies hydraulic pressure (apply pressure) from one side of the lock-up clutch 9, and when released, needs to supply hydraulic pressure (release pressure) from the other side. In the released state of the lock-up clutch 9, because the oil temperature rises based on the rotation speed difference, it is necessary to supply release pressure+lubrication oil. This release pressure+lubrication oil is oil that is ejected from the torque converter 2 after passing through the lock-up clutch 9, and is sent to an oil pan, so must not be more than the oil amount ejected from the torque converter 2. Otherwise, the apply pressure side becomes higher, and it becomes impossible to maintain the released state of the lock-up clutch 9. On the other hand, in the engaged state of the lock-up clutch 9, since there is not a rotation speed difference, lubrication is not necessary, and the required flow rate can be low.

Therefore, "a state for which hydraulic pressure is applied to put the lock-up clutch 9 in a power transmission state" has a lower required oil amount than a state for which hydraulic pressure is applied to achieve a state for which lock-up clutch 9 does not transmit power, and the amount of oil consumed by the torque converter 2 is lower.

Here, explained is the reason for engaging the drive system clutch Fwd/C with the sailing stop travel conditions not established. When the sailing stop travel conditions are not established due to an acceleration request from the driver (e.g. an operation of pressing the accelerator), it is necessary to engage the drive system clutch Fwd/C to transmit the power of the engine 1 to the drive wheels 7. Also, when the sailing stop travel conditions are not established due to a deceleration request from the driver (e.g. an operation of pressing the brake), this is due to the need to engage the drive system clutch Fwd/C to perform a fuel cut (to improve fuel efficiency) by having a state with the drive wheels 7 and the engine 1 connected.

Next, explained is a mechanism for increasing the flow rate that can be secured upstream by reducing the required flow rate to the torque converter 2.

First, during sailing stop control, the line pressure regulator valve 211 has zero for the target line pressure, and stops the supply of hydraulic oil to the primary pulley 21 or the secondary pulley 22. Thus, the amount of oil discharged from the electric oil pump 50 flows from the line pressure regulator valve 211→torque converter pressure regulator valve 221→lock-up control valve 223→torque converter 2. At this time, when the lock-up clutch 9 is in a released state, it is necessary to discharge from the electric oil pump 50 the release pressure+lubrication oil in the amount for maintaining the released state. The reason for this is that, since the lock-up clutch 9 is a single plate clutch rather than a multi plate clutch, as shown in FIG. 4, the hydraulic pressure circuit is used for both release pressure and lubrication.

On the other hand, when the lock-up clutch 9 is in an engaged state, lubrication is not necessary, and it is sufficient to simply discharge from the electric oil pump 50 the apply pressure in the amount for maintaining the engaged state of the lock-up clutch 9.

Then, when leaving sailing stop control, the discharge flow rate from the electric oil pump 50 is first used to fill the hydraulic oil lost from the primary pulley 21, the secondary pulley 22, or the circuit during sailing stop control. Then, after filling of the missing hydraulic oil is completed, the pulley pressure is raised, and after that, the clutch pressure of the drive system clutch Fwd/C is raised, and the system returns to a normal traveling state.

Thus, when the lock-up clutch 9 is in an engaged state, compared to when the lock-up clutch 9 is in a released state, by reducing the required flow rate to the torque converter 2, the flow rate that can be secured by the primary pulley 21, the secondary pulley 22, or the drive system clutch Fwd/C which are upstream of the torque converter 2 is increased.

Figure 7:
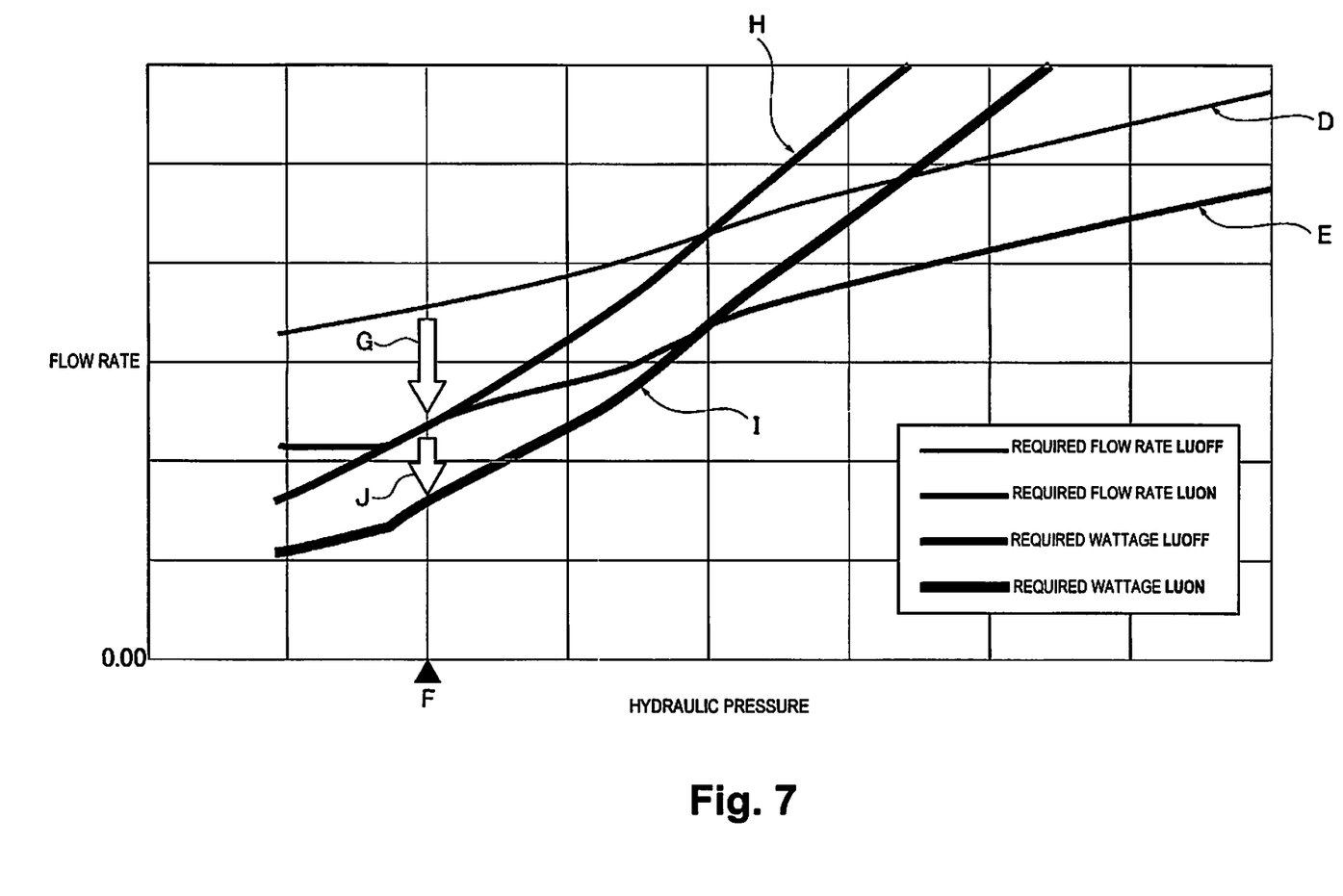
FIG. 7 is an effect comparison characteristics diagram showing the flow rate difference and the required wattage difference when engagement of the lock-up clutch is continued and when it is released, with coasting by the sailing stop control of a vehicle in which the device of Embodiment 1 is mounted.

Next, the effect on the unit required flow rate by changing the lock-up clutch 9 from the released state to the engaged state during sailing stop control is explained based on FIG. 7.

When the lock-up clutch 9 is in a released state, the required flow rate characteristics by simulation are the characteristics D in FIG. 7, and when the lock-up clutch 9 is in an engaged state, the required flow rate characteristics by simulation are the characteristics E in FIG. 7. Thus, the flow rate from the electric oil pump 50 for holding the same pressure F is less when the lock-up clutch 9 is in the engaged state (arrow G).

Similarly, when the lock-up clutch 9 is in the released state, the required wattage characteristics by simulation are characteristics H in FIG. 7, and when the lock-up clutch 9 is in the engaged state, the required flow rate characteristics by simulation are characteristics I in FIG. 7. Thus, the required wattage consumed by the electric oil pump 50 to hold the same pressure F is less when the lock-up clutch 9 is in the engaged state (arrow J).

Other Feature Operations

With Embodiment 1, at least during the time from when the sailing stop travel conditions are established until the sailing stop travel conditions are not established, there is a state for which the hydraulic pressure is applied to the lock-up clutch 9 to have the lock-up clutch 9 be in a power transmission state.

Specifically, during coasting using sailing stop control, it is unclear when the sailing stop travel conditions are not established. Therefore, at least from when the sailing stop travel conditions are established and thereafter, if the state is made to be such that the hydraulic pressure for having the lock-up clutch 9 to be in a power transmission state is always applied, regardless of when the sailing stop travel conditions are not established, it is possible to shorten the time lag until the drive system clutch Fwd/C reaches a power transmission state.

With Embodiment 1, the power transmission amount of the lock-up clutch 9 is controlled by the electric oil pump 50. Then, the state for which the hydraulic pressure for having the lock-up clutch 9 be in a power transmission state is applied is a state for which the piston strokes of the lock-up clutch 9 are completed, specifically, the state directly before the start of power transmission by the lock-up clutch 9.

Specifically, by ending of the coasting using sailing stop control, the torque input to the lock-up clutch 9 is unclear. Regardless of the torque that is input, to make it so that the lock-up clutch 9 does not slip, it is necessary to supply extremely high hydraulic pressure, and a hydraulic pressure source capable of outputting high hydraulic pressure is required. In light of that, during coasting using sailing stop control for which the input torque is unknown, having the power transmission amount become unnecessarily high is prevented by having a piston stroke completed state.

Therefore, it is possible to lower the hydraulic pressure required for the hydraulic pressure source. Furthermore, when using the electric oil pump 50 as the hydraulic pressure source, by the hydraulic pressure required for the electric oil pump 50 being reduced, it is possible to have lower cost and improved mountability by having the pump be smaller.

With Embodiment 1, using the engine 1 as the traveling drive source, at least having the brake pedal off is included in the sailing stop travel conditions, and fuel cut control is executed that stops fuel injection by the brake pedal being on.

Specifically, during coasting using sailing stop control, when the brake pedal is pressed, coasting using sailing stop control ends, the engine 1 is restarted, and the drive system clutch Fwd/C is engaged. After that, there is a shift to fuel cut control, but when coasting using sailing stop control ends, the lock-up clutch 9 is in a piston stroke completed state, and since it is possible to quickly go to an engaged state, it is possible to move to fuel cut control at the moment the engagement of the drive system clutch Fwd/C is completed.

Therefore, the time from the brake pedal pressing operation until fuel cut start is short, and it is possible to improve fuel efficiency.

Next, the effects are explained.

The effects listed below can be obtained with the sailing stop control method and control device of the engine vehicle of Embodiment 1.

(1) A vehicle (engine vehicle) provided with:

a friction engagement element (drive system clutch Fwd/C) disposed between the traveling drive source (engine 1) and the drive wheels 7, a torque converter 2 disposed between the friction engagement element (drive system clutch Fwd/C) and the traveling drive source (engine 1), and provided with a lock-up clutch 9 for which the power transmission amount is controlled based on the hydraulic pressure, and a hydraulic pressure source (electric oil pump 50) that can supply hydraulic pressure when the traveling drive source (engine 1) is stopped, wherein based on a sailing stop travel condition being established, coasting is performed using sailing stop control that cuts off the power transmission of the friction engagement element (drive system clutch Fwd/C), and also stops the traveling drive source (engine 1), and during coasting by sailing stop control, the state is such that hydraulic pressure is applied to the lock-up clutch 9 to have the lock-up clutch 9 be in a power transmission state.

Because of that, when leaving sailing stop control, it is possible to provide a sailing stop control method of a vehicle (engine vehicle) for which the time lag until the friction engagement element (drive system clutch Fwd/C) goes to a power transmission state is shortened.

(2) During at least from the sailing stop travel condition being established until the sailing stop travel condition is not established, the state is such that hydraulic pressure is applied to the lock-up clutch 9 to have the lock-up clutch 9 be in a power transmission state.

Because of this, in addition to the effect of (1), during coasting using sailing stop control, regardless of when the sailing stop travel condition is not established, it is possible to shorten the time lag until the friction engagement element (drive system clutch Fwd/C) is in a power transmission state.

(3) The power transmission amount of the lock-up clutch 9 is controlled by the hydraulic pressure source (electric oil pump 50), and the state of the piston stroke of the lock-up clutch 9 being completed is the state of hydraulic pressure being applied to have the lock-up clutch 9 be in a power transmission state.

Because of this, in addition to the effects of (1) or (2), it is also possible to lower the flow rate required for the hydraulic pressure source while coasting using sailing stop control.

In particular, when using the electric oil pump 50 as the hydraulic pressure source, it is possible to have lower cost and improved mountability by making the pump smaller.

(4) The traveling drive source is the engine 1, and the sailing stop travel condition at least include a brake pedal off condition, and fuel cut control is executed that stops fuel injection by a brake pedal on condition being established.

Because of this, in addition to the effects of (1) to (3), it is also possible to improve fuel efficiency by shortening the time from the brake pedal stepping operation until the fuel cut start.

(5) A vehicle (engine vehicle) is provided with:

a friction engagement element (drive system clutch Fwd/C) disposed between the traveling drive source (engine 1) and the drive wheels 7, a torque converter 2 disposed between the friction engagement element (drive system clutch Fwd/C) and the traveling drive source (engine 1), and provided with a lock-up clutch 9 for which the power transmission amount is controlled based on the hydraulic pressure, and a hydraulic pressure source (electric oil pump 50) that can supply hydraulic pressure while the traveling drive source (engine 1) is stopped, wherein provided is a sailing stop control unit (integrated controller 13) by which, based on a sailing stop travel condition being established, the power transmission of the friction engagement element (drive system clutch Fwd/C) is cut off, and also the traveling drive source (engine 1) is stopped to perform coasting by sailing stop control, and the sailing stop control unit (integrated controller 13) makes it so that, during coasting by sailing stop control, the state is such that hydraulic pressure is applied to the lock-up clutch 9 to have the lock-up clutch 9 be in a power transmission state.

Because of that, when leaving sailing stop control, it is possible to provide a sailing stop control device of a vehicle (engine vehicle) for which the time lag until the friction engagement element (drive system clutch Fwd/C) goes to a power transmission state is shortened.

Above, the vehicle sailing stop control method and control device of the present invention was explained based on Embodiment 1, but regarding specific configurations, the invention is not limited to this Embodiment 1, and design changes, additions, etc. are allowed provided they do not stray from the gist of the invention in each claim of the claims.

With Embodiment 1, as the hydraulic pressure source that can supply hydraulic pressure when the traveling drive source is stopped, an example is shown of using the electric oil pump 50. However, as the hydraulic pressure source capable of supplying hydraulic pressure when the traveling drive source is stopped, it is also possible to use an accumulator, etc.

With Embodiment 1, an example was shown of applying the vehicle sailing stop control method and control device of the present invention to an engine vehicle in which is mounted a continuously variable transmission with an auxiliary transmission. However, the sailing stop control method and control device of the present invention can also be applied to a vehicle mounted with a continuously variable transmission, a vehicle mounted with a stepped transmission, or a vehicle which is not mounted with a transmission. Also, the vehicle is not limited to being an engine vehicle, and the invention can also be applied to a hybrid vehicle, electric vehicle, etc. In other words, it can be applied to any vehicle as long as it is a vehicle provided with a friction engagement element, a torque converter provided with a lock-up clutch, and a hydraulic pressure source.

The invention claimed is:

1. A vehicle sailing stop control method for a vehicle including a friction engagement element disposed between a traveling drive source and drive wheels, a torque converter disposed between the friction engagement element and the traveling drive source, and including a lock-up clutch for which a power transmission amount is controlled based on hydraulic pressure, wherein when the lock-up clutch is in a power transmission state, a prescribed apply hydraulic pressure is supplied to the lock-up clutch from one side of the lock-up clutch, and when the lock-up clutch is in a state for which the lock-up clutch does not transmit power, a prescribed release hydraulic pressure and lubrication oil are supplied from the other side of the lock-up clutch such that the power transmission state has a lower required oil amount than the state for which the lock-up clutch does not transmit power, a mechanical oil pump configured to be driven by power from the traveling drive source, and a hydraulic pressure source configured to supply the hydraulic pressure while the traveling drive source is stopped, the vehicle sailing stop control method comprising:

performing sailing stop control so that coasting is performed by cutting off power transmission of the friction engagement element, stopping the traveling drive source, and starting actual operation by the hydraulic pressure source upon a sailing stop travel condition being established;

during coasting by the sailing stop control, placing the lock-up clutch in the power transmission state in which the hydraulic pressure is applied to the lock-up clutch by the hydraulic pressure source; and starting the traveling drive source and outputting an initial pressure command to the friction engagement element while maintaining the actual operation by the hydraulic pressure source, upon the sailing stop travel condition becoming not established.

2. The vehicle sailing stop control method according to claim 1, wherein the lock-up clutch is placed in the power transmission state in which the hydraulic pressure is applied to the lock-up clutch at least during a period from the sailing stop travel condition being established until the sailing stop travel condition is not established.

3. The vehicle sailing stop control method according to claim 1, further comprising controlling the power transmission amount of the lock-up clutch by the hydraulic pressure source, wherein a state when a piston stroke of the lock-up clutch is completed is the power transmission state in which the hydraulic pressure is applied to the lock-up clutch.

4. The vehicle sailing stop control method according to claim 1, wherein the traveling drive source is an engine, the sailing stop travel condition includes at least a brake pedal off condition, and fuel cut control is executed to stop fuel injection upon a brake pedal on condition being established.

5. A vehicle sailing stop control device for a vehicle including a friction engagement element disposed between a traveling drive source and drive wheels, a torque converter disposed between the friction engagement element and the traveling drive source, and including a lock-up clutch for which the power transmission amount is controlled based on hydraulic pressure, wherein, when the lock-up clutch is in a power transmission state, a prescribed apply hydraulic pressure is supplied to the lock-un clutch from one side of the lock-up clutch, and when the lock-up clutch is in a state for which the lock-up clutch does not transmit power, a prescribed release hydraulic pressure and lubrication oil are supplied from the other side of the lock-up clutch such that the power transmission state has a lower required oil amount than the state for which the lock-up clutch does not transmit power, a mechanical oil pump configured to be driven by power from the traveling drive source, and a hydraulic pressure source configured to supply hydraulic pressure while the traveling drive source is stopped, the vehicle sailing stop control device comprising:

a sailing stop control unit configured to cut off power transmission of the friction engagement element to stop the traveling drive source to perform coasting, and starting actual operation by the hydraulic pressure source upon a sailing stop travel condition being established, wherein the sailing stop control unit being further configured to place the lock-up clutch in the power transmission state in which the hydraulic pressure is applied to the lock-up clutch by the hydraulic pressure source, during coasting by the sailing stop control, and the sailing stop control unit being further configured to start the traveling drive source and output an initial pressure command to the friction engagement element while maintaining the actual operation by the hydraulic pressure source, upon the sailing stop travel condition becoming not established.

6. A vehicle sailing stop control device for a vehicle including a friction engagement element disposed between a traveling drive source and drive wheels, a torque converter disposed between the friction engagement element and the traveling drive source, and including a lock-up clutch for which the power transmission amount is controlled based on hydraulic pressure, wherein, when the lock-up clutch is in a power transmission state, a prescribed apply hydraulic pressure is supplied to the lock-up clutch from one side of the lock-up clutch, and when the lock-up clutch is in a state for which the lock-up clutch does not transmit power, a prescribed release hydraulic pressure and lubrication oil are supplied from the other side of the lock-up clutch such that the power transmission state has a lower required oil amount than the state for which the lock-up clutch does not transmit power, a mechanical oil pump configured to be driven by power from the traveling drive source, and a hydraulic pressure source configured to supply hydraulic pressure while the traveling drive source is stopped, the vehicle sailing stop control device comprising:

sailing stop control means for cutting off power transmission of the friction engagement element, stopping the traveling drive source to perform coasting, and starting actual operation by the hydraulic pressure source upon a sailing stop travel condition being established;

lock-up clutch control means for placing the lock-up clutch in the power transmission state in which the hydraulic pressure is applied to the lock-up clutch by the hydraulic pressure source, during coasting by the sailing stop control; wherein the sailing stop control means further has a function for starting the traveling drive source and outputting an initial pressure command to the friction engagement element while maintaining the actual operation by the hydraulic pressure source, upon the sailing stop travel condition becoming not established.

* * * * *